United States Patent
Komaki

(10) Patent No.: US 9,992,359 B2
(45) Date of Patent: Jun. 5, 2018

(54) RELAY DEVICE EMPLOY TECHNIQUE OF CONTROLLING A COMMUNICATION PATH ESTABLISHED WITH A SERVER AND AN IMAGE PROCESSING DEVICE WHEN COMMUNICATION ARE RELAYED

(71) Applicant: Konica Minolta, Inc., Chiyoda-ku, Tokyo (JP)

(72) Inventor: Yoshio Komaki, Nishinomiya (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days. days.

(21) Appl. No.: 14/849,286

(22) Filed: Sep. 9, 2015

(65) Prior Publication Data
US 2016/0077775 A1    Mar. 17, 2016

(30) Foreign Application Priority Data
Sep. 11, 2014  (JP) ................................ 2014-184818

(51) Int. Cl.
*H04L 29/06*  (2006.01)
*H04N 1/00*   (2006.01)
(Continued)

(52) U.S. Cl.
CPC ......... *H04N 1/00244* (2013.01); *G06F 3/126* (2013.01); *G06F 3/1212* (2013.01);
(Continued)

(58) Field of Classification Search
CPC ...... G06F 3/129; G06F 3/1236; G06F 3/1286; G06F 3/1287
See application file for complete search history.

(56) References Cited

U.S. PATENT DOCUMENTS

2002/0010765 A1  1/2002  Border
2005/0169254 A1  8/2005  Kurita et al.
(Continued)

FOREIGN PATENT DOCUMENTS

EP   1 175 051 A2   1/2002
JP   2011-114678 A  6/2011
(Continued)

OTHER PUBLICATIONS

Extended European Search Report dated Feb. 26, 2016, issued by the European Patent Office in the corresponding European Application No. 15184209.3. (8 pages).
(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

A communication relay device installed on a local network relays communications between an image processing device installed on the local network and an application server installed on a network different from the local network. The communication relay device comprises: a communication path setting part that sets a communication path to send and receive job data of a job to and from the application server when the job is created at the image processing device or the application server; and a communication controller that sends and receives the job data to and from the application server over the communication path. When a new job is created at the image processing device or the application server as at least one communication path has been established with the application server, the communication path setting part sets either the new communication path or the existing communication path for the new job.

29 Claims, 11 Drawing Sheets

(51) Int. Cl.
  *G06F 3/12*    (2006.01)
  *G06K 15/02*   (2006.01)
  *H04L 29/08*   (2006.01)
  *H04L 12/721*  (2013.01)
  *H04L 12/803*  (2013.01)
  *H04L 12/851*  (2013.01)

(52) U.S. Cl.
  CPC .......... *G06F 3/1236* (2013.01); *G06F 3/1287* (2013.01); *G06F 3/1288* (2013.01); *G06K 15/1806* (2013.01); *H04L 67/327* (2013.01); *H04N 1/00* (2013.01); *H04L 45/12* (2013.01); *H04L 47/125* (2013.01); *H04L 47/24* (2013.01); *H04N 2201/0094* (2013.01)

(56) References Cited

U.S. PATENT DOCUMENTS

| | | | |
|---|---|---|---|
| 2011/0289235 A1 | 11/2011 | Takashima | |
| 2012/0092723 A1* | 4/2012 | Jaudon | G06F 3/1204 358/1.15 |
| 2014/0095557 A1* | 4/2014 | Kamma | G06F 17/30194 707/827 |
| 2014/0237075 A1* | 8/2014 | Ida | H04L 67/322 709/217 |
| 2014/0259147 A1* | 9/2014 | L'Heureux | H04L 63/02 726/14 |
| 2014/0293296 A1* | 10/2014 | Srivatsan | G06F 3/12 358/1.6 |

FOREIGN PATENT DOCUMENTS

| | | |
|---|---|---|
| JP | 2013-051597 A | 3/2013 |
| WO | WO 2004/093394 A1 | 10/2004 |
| WO | WO 2010/106772 A1 | 9/2010 |

OTHER PUBLICATIONS

Office Action dated Nov. 22, 2016, by the Japanese Patent Office in corresponding Japanese Patent Application No. 2014-184818 and English translation of the Office Action. (11 pages).

First Notice of the Opinion on Examination dated Nov. 1, 2017, by the State Intellectual Property Office of the People's Republic of China in corresponding Chinese Patent Application No. 201510572145.3 and English translation of the Office Action (17 pages).

Second Notice of the Opinion on Examination dated Mar. 13, 2018, by the State Intellectual Property Office of the People's Republic of China in corresponding Chinese Patent Application No. 201510572145.3 and English translation of the Office Action (12 pages).

* cited by examiner

FIG. 3

ATTRIBUTION INFORMATION  13

| JOB ID | JOB001234 |
|---|---|
| JOB TYPE | PRINT |
| DESTINATION DEVICE | IMAGE PROCESSING DEVICE |
| JOB ISSUED USER | USER A (GENERAL USER) |
| JOB ISSUED DEVICE | APPLICATION SERVER |
| AMOUNT OF DATA | 54MB |

FIG. 4A

25a     COMMUNICATION PATH DETERMINATION INFORMATION 25

| JOB TYPE | JOB ISSUED DEVICE | JOB ISSUED USER | REAL-TIME PROCESSING |
|---|---|---|---|
| PRINT | APPLICATION SERVER | GENERAL USER/ ADMINISTRATIVE USER | UNNECESSARY |
|  | IMAGE PROCESSING DEVICE | GENERAL USER/ ADMINISTRATIVE USER | NECESSARY |
| SCAN | APPLICATION SERVER | GENERAL USER/ ADMINISTRATIVE USER | NECESSARY |
|  | IMAGE PROCESSING DEVICE | GENERAL USER | UNNECESSARY |
|  |  | ADMINISTRATIVE USER | NECESSARY |
| UPLOAD OF BOX DATA | APPLICATION SERVER | — | NECESSARY |
|  | IMAGE PROCESSING DEVICE | — | UNNECESSARY |
| MESSAGE NOTIFICATION | APPLICATION SERVER | — | NECESSARY |
|  | IMAGE PROCESSING DEVICE | — | NECESSARY |

FIG. 4B

25b     COMMUNICATION PATH DETERMINATION INFORMATION 25

| REAL-TIME PROCESSING | DATA AMOUNT | PRIORITY LEVEL |
|---|---|---|
| NECESSARY | LARGE | 6 |
|  | MEDIUM | 5 |
|  | SMALL | 4 |
| UNNECESSARY | SMALL | 3 |
|  | MEDIUM | 2 |
|  | LARGE | 1 |

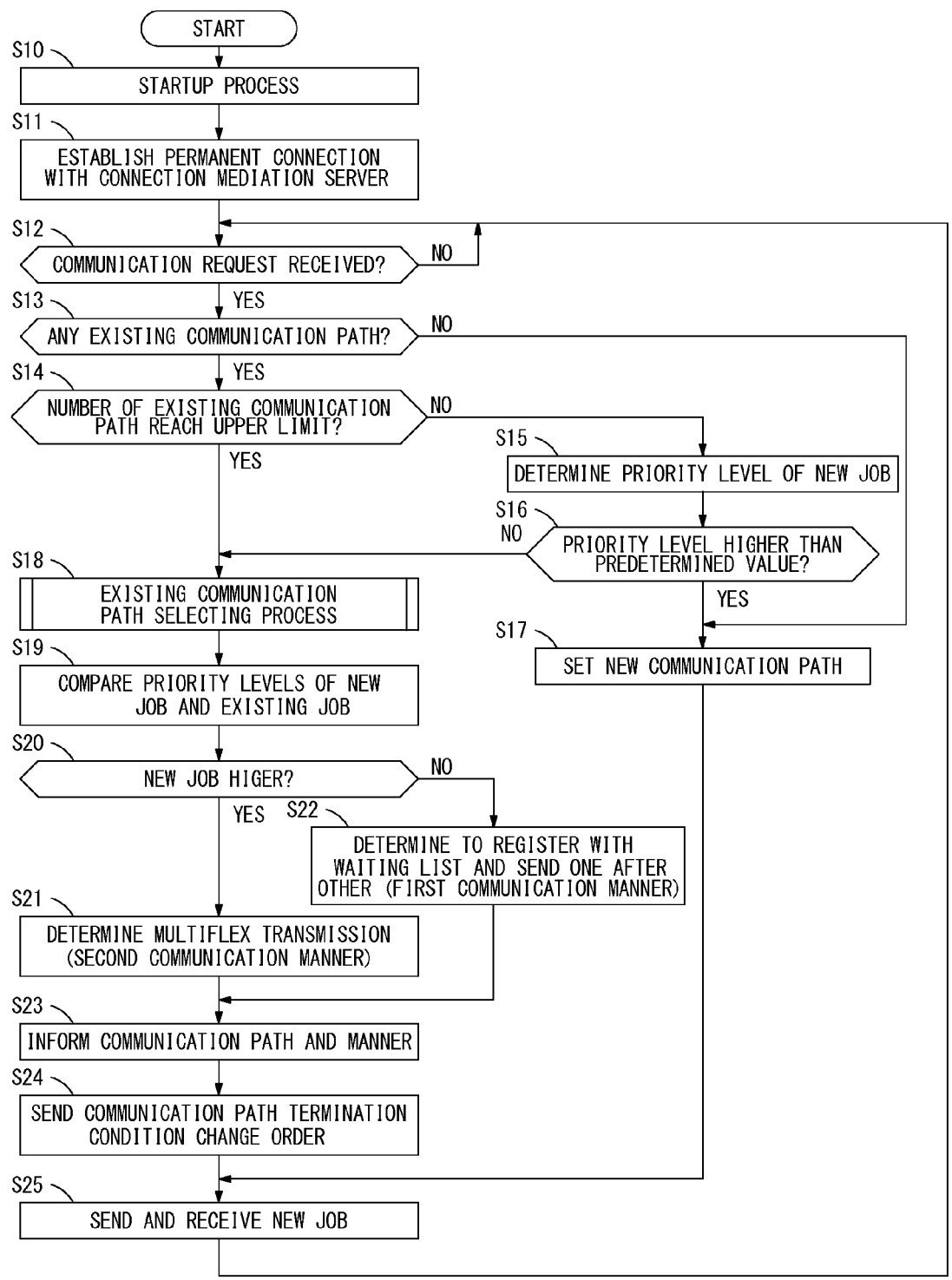

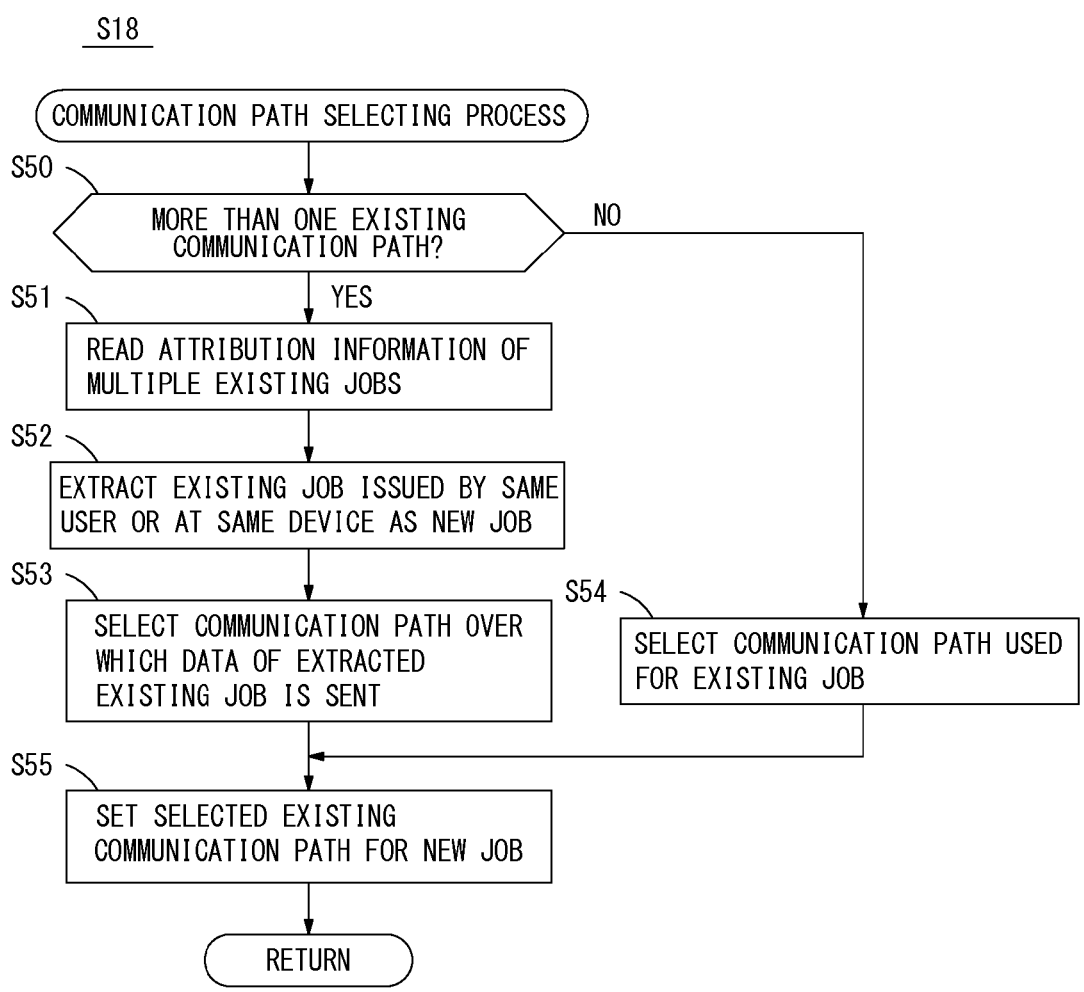

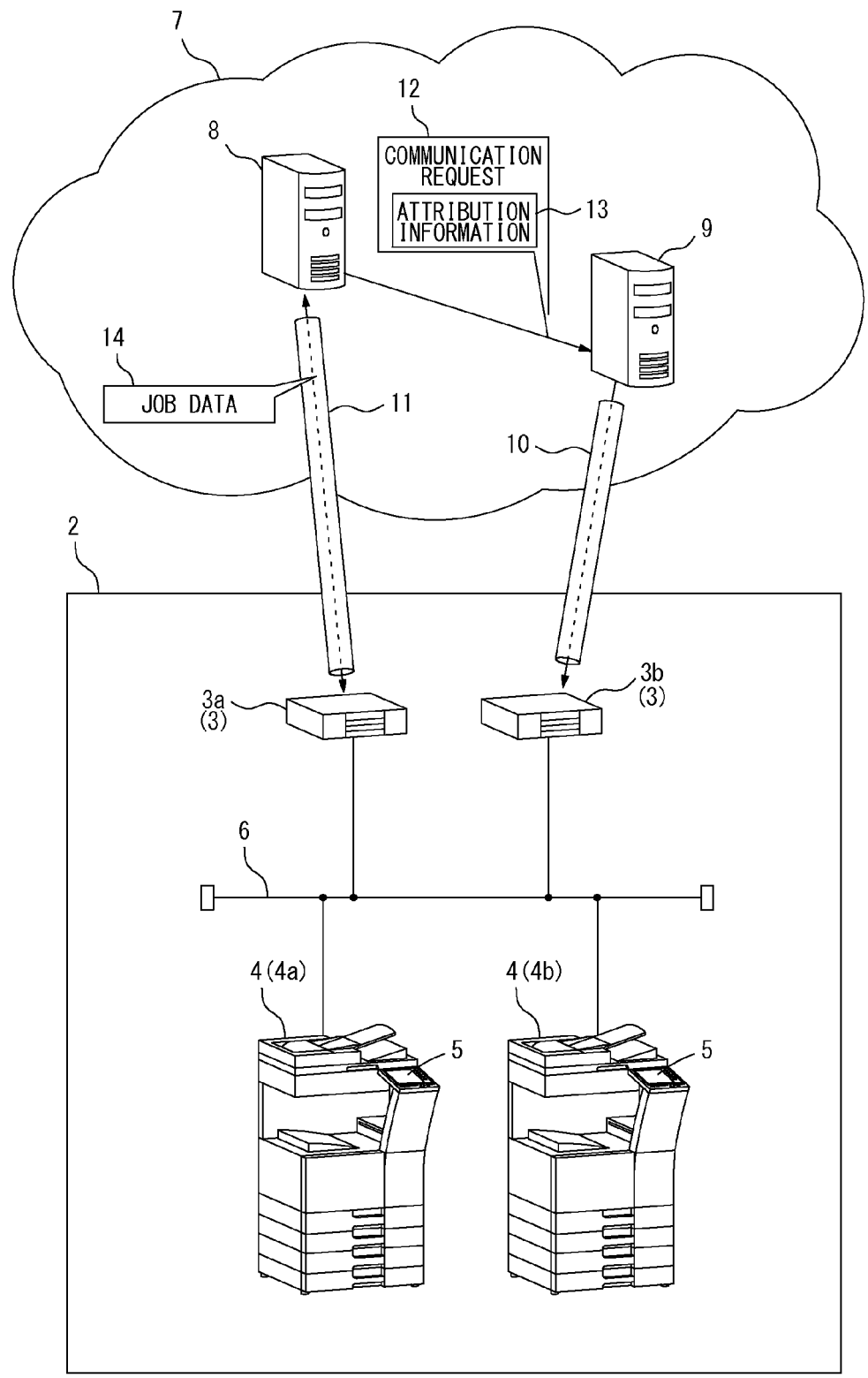

RELAY DEVICE EMPLOY TECHNIQUE OF CONTROLLING A COMMUNICATION PATH ESTABLISHED WITH A SERVER AND AN IMAGE PROCESSING DEVICE WHEN COMMUNICATION ARE RELAYED

This application is based on the application No. 2014-184818 filed in Japan, the contents of which are hereby incorporated by reference.

BACKGROUND OF THE INVENTION

Field of the Invention

The present invention relates to a communication relay device, a non-transitory readable recording medium and a communication relay method. The present invention more specifically relates to a technique of controlling a communication path established with an application server when communications between the application server and an image processing device are relayed.

Description of the Background Art

Recently, application servers have been installed on a cloud on an internet, and they provide with a variety of application services (cloud services). As users have an access to the application services at anytime from anywhere, those application services are convenient for the users. Image processing devices such as MFPs (Multifunction Peripherals) installed at places such as offices capable of executing jobs by working in concert with the application servers have been introduced along with the popularization of the application services. This known technique is introduced for example in Japanese Patent Application Laid-Open No. JP 2013-51597 A. According to this known technique, the system that causes the image processing device and the application server operate in concert with each other is capable of making the image processing device execute a print job by downloading data such as a document or an image stored in the application server, or upload image data generated by a scan job by the image processing device to the application server.

The aforementioned system includes a communication relay device that establishes a communication path with the application server in a local network environment in which the image processing device is installed. The communication relay device is installed in order to realize a transmission of job data to the image processing device from the application server if a job is created at the application server. The communication relay device accesses a connection mediation server installed on a cloud on an internet at its startup, thereby establishing permanent connection. After the permanent connection is established, a job that requires the communication with the image processing device may be created at the application server. In this case, the application server sends a communication request with the communication relay device to the connection mediation server. In response to receiving the communication request, the connection mediation server sends the communication request to the communication relay device on the local network over the communication path that maintains the permanent connection. After receiving the communication request issued by the application server from the connection mediation server, the communication relay device accesses the application server on the internet and establishes the communication path with the application server. As a result, the communication path is established between the application server and the communication relay device. The application server then sends the job data to the communication relay device over the communication path, and the communication relay device forwards the job data to the image processing device.

It is assumed that the job that requires the communication with the application server is created at the image processing device on the local network. In this case, the image processing device sends the job data corresponding to the job to the communication relay device. After receiving the job data from the image processing device, the communication relay device identifies the application server which is the connecting destination, and connects to the application server on the internet over the local network. The communication path with the application server is then established. The communication relay device forwards the job data received from the image processing device to the application server over the communication path established with the application server.

The communication relay device is installed in the local network environment so that two-way communication between the application server and the image processing device is allowed. Even when the job is created at either the application server or the image processing device, the job data corresponding to the job is allowed to be sent and received between the application server and the image processing device.

The conventional system that makes the image processing device and the application server work in concert with each other, however, requires generation of a new communication path for the communication relay device to transmit and receive the job data of the job every time the job is created at the application server or the image processing device. Thus, the number of the communication paths that should be managed by the application server is increased, resulting in increased load on the application server. Especially the application server is connected to a number of the local networks. If the communication path is established for each job, the performance at the application server for providing with the application services may be decreased.

SUMMARY OF THE INVENTION

The present invention is intended to solve the above problems. Thus, the present invention is intended to provide a communication relay device, a non-transitory computer readable recording medium and a communication relay method capable of reducing a load on an application server by controlling a communication path established with the application server.

First, the present invention is directed to a communication relay device installed on a local network. The communication relay device relays communications between an image processing device installed on the local network and an application server installed on a network different from the local network.

According to one aspect of this invention, the communication relay device comprises: a communication path setting part that sets a communication path to send and receive job data of a job to and from the application server when the job is created at the image processing device or the application server; and a communication controller that sends and receives the job data to and from the application server over the communication path set by the communication path setting part. When a new job is created at the image processing device or the application server as at least one communication path has been established with the application server, the communication path setting part sets either the new communication path or the existing communication path for transmission and receipt of the job data of the new job.

Second, the present invention is directed to a non-transitory computer readable recording medium storing a program to be executed by a communication relay device installed on a local network. The program is executed to relay communications between an image processing device installed on the local network and an application server installed on a network different from the local network.

According to one aspect of this invention, execution of the program by the communication relay device causing the communication relay device to execute the steps of: (a) setting a communication path to send and receive job data of a job to and from the application server when the job is created at the image processing device or the application server; and (b) sending and receiving the job data to and from the application server over the communication path set in the step (a). When a new job is created at the image processing device or the application server as at least one communication path has been established with the application server, either the new communication path or the existing communication path is set for transmission and receipt of the job data of the new job in the step (a).

Third, the present invention is directed to a communication relay method of relaying communications between an image processing device installed on the local network and an application server installed on a network different from the local network.

According to one aspect of this invention, the communication relay method comprises the steps of: (a) setting a communication path to send and receive job data of a job to and from the application server when the job is created at the image processing device or the application server; and (b) sending and receiving the job data to and from the application server over the communication path set in the step (a). When a new job is created at the image processing device or the application server as at least one communication path has been established with the application server, either the new communication path or the existing communication path is set for transmission and receipt of the job data of the new job in the step (a).

BRIEF DESCRIPTION OF THE DRAWINGS

FIG. 3 shows an example of attribution information of a job;

FIGS. 4A and 4B show an example of communication path determination information;

FIG. 5 is a flow diagram explaining an exemplary sequential procedure of a process performed at the communication relay device;

FIG. 8 is a flow diagram explaining an exemplary third sequential procedure relating to the existing communication path selecting process;

FIG. 10 shows an exemplary configuration of the information processing system of a second preferred embodiment.

DESCRIPTION OF THE PRESENT PREFERRED EMBODIMENTS

Figure 1:
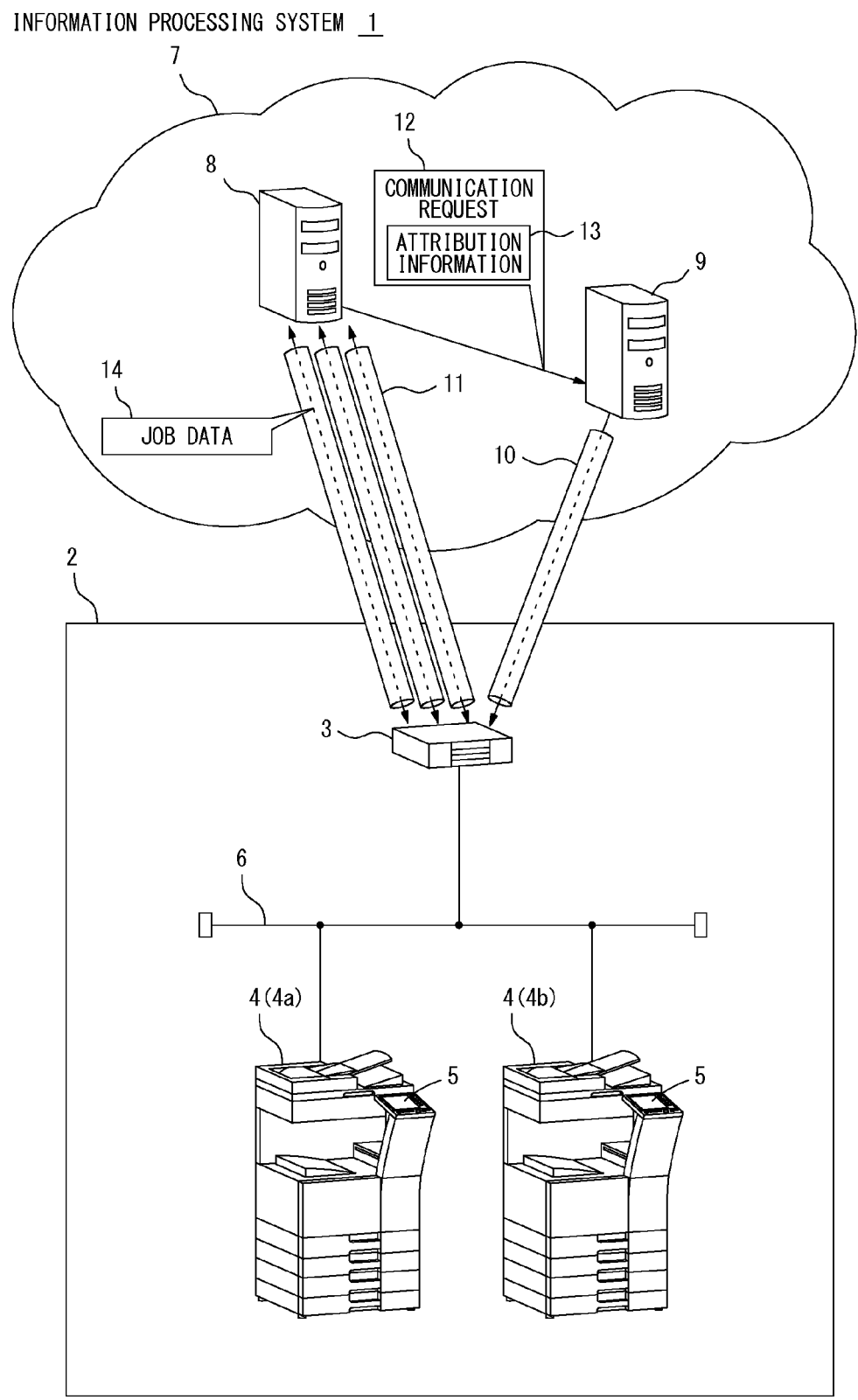
FIG. 1 shows an exemplary configuration of an information processing system of a first preferred embodiment.

Preferred embodiments of the present invention are described in detail below with reference to figures. In the description given below, those elements which are shared in common among figures are represented by the same reference numerals, and these elements are not discussed repeatedly for the same description.

(First Preferred Embodiment)

FIG. 1 shows an exemplary configuration of an information processing system 1 of the first preferred embodiment of the present invention. The information processing system 1 comprises a communication relay device 3, an image processing device 4, an application server 8 and a connection mediation server 9. The communication relay device 3 and the image processing device 4 are installed in a local environment 2 such as an office, and connected to a local network 6 such as a LAN (Local Area Network). The application server 8 and the connection mediation server 9 are installed on a cloud 7 on an internet. In the example of FIG. 1, two image processing devices 4a and 4b are connected to the local network 6. The number of the image processing devices 4, however, is not necessarily two. Also, in the example of FIG. 1, only one application server 8 is installed on the cloud 7. The number of the application server 8, however, is not necessarily one, and it may be more than two. Moreover, a firewall is installed at a connecting part to the internet of the local network 6, which is not shown in FIG. 1.

The application server 8 provides with a various types of application services (cloud services) over the internet. The services provided by the application server 8 include storage services for storing uploaded data and information processing services for executing variety of information processing such as edition, processing and conversion of the uploaded data, for example.

In response to detecting an access from a web browser over the internet, the application server 8 sends a web page to a device which has accessed the application server 8. The web page is a screen to be a user interface for the application service. The user operates an information processing terminal such as a tablet terminal to startup the web browser and access the application server 8. The web page for the application service is then displayed. The user may make an operation on the web page so that the job is allowed to be created at the application server 8. It is assumed, for example, the user designates the image processing device 4 installed in the local environment 2 and gives an instruction to print the data such as the document or the image stored in the application server 8. In this case, the application server 8 creates a print job to send to the image processing device 4.

The image processing device 4, for example, constructed by one of MFPs, is capable of executing a variety of jobs such as copy jobs, print jobs and scan jobs. The image processing device 4 is allowed to receive the data such as the document or the image as the job data over the local network 6, and produce printed outputs based on the job data by executing the print job, for example. The image processing device 4 is allowed to send the image data generated by reading a document as the job data over the local network 6 to a designated destination by executing the scan job, for example. The image processing device 4 also includes a function to store the data such as the document or the image in a predetermined storage which is called a box. Thus, the image processing device 4 is allowed to send the data stored in the box as the job data over the local network 6 to the designated destination.

The image processing device 4 is provided with an operational panel 5, a user interface for the user to operate the image processing device 4. By operating the operational panel 5, the user is allowed to specify a job type and give the instruction to the image processing device 4 on execution of the job. By communicating with the application server 8 on the cloud 7, the image processing device 4 is capable of working in concert with the application server 8 to execute the job. A cooperation application for working together with the application server 8 is installed in advance on the image processing device 4. The user operates the operational panel 5 to startup the cooperation application so that the job for cooperation with the application server 8 may be registered and executed. The jobs require the cooperation with the application server 8 at the image processing device 4 include the print job that obtains the data stored in the application server 8 and produces the printed output based on the obtained data or the scan job that uploads the image data generated by reading the document to the application server 8, for example.

The communication relay device 3 relays communications between the image processing device 4 installed on the local network 6 and the application server 8 installed on the cloud 7. The communication relay device 3 registers at least one of the multiple image processing devices 4a and 4b installed on the local network 6 with registration information such as a table in advance as a communication relay target and manages. The image processing device 4 to be the communication relay target is registered in advance by an administrator, for instance. However, this is given not for limitation. The communication relay device 3 may search for the image processing device 4 connected to the local network 6 at its startup, and automatically register the image processing device 4 to be the communication relay target. The communication relay device 3 relays the communications between the image processing device 4 registered in advance as the communication relay target with the registration information and the application server 8. The multiple image processing devices 4a and 4b as shown in FIG. 1 are registered as the communication relay targets with the communication relay device 3 of the first preferred embodiment.

The communication relay device 3 receives the job data from a sender and forwards to a destination for a transmission and receipt of the job data between the application server 8 and the image processing device 4. The communication relay device 3 connects to the connection mediation server 9 installed on the cloud 7 on the internet at its startup in response to being powered on, and establishes a communication path 10 which allows permanent two-way communication with the connection mediation server 9. The XMPP (eXtensible Messaging and Presence Protocol) session between the communication relay device 3 and the connection mediation server 9 with each other, for instance, is established so that the communication path 10 is realized. After the communication path 10 between the communication relay device 3 and the connection mediation server 9 is normally established, the communication relay device 3 finishes preparation for relaying the communications between the application server 8 and the image processing device 4.

After the job that requires the communications with another device at either of the application server 8 or the image processing device 4 is created, the communication relay device 3 relays the job data sent and received between the application server 8 and the image processing device 4.

It is assumed, for example, that the job is created at the application server 8. In this case, the application server 8 sends a communication request 12 with the communication relay device 3 to the connection mediation server 9 as shown in FIG. 1. The communication request 12 includes attribution information 13 of the job created at the application server 8. In response to receiving the communication request 12, the connection mediation server 9 sends the communication request 12 to the communication relay device 3 over the communication path 10 which allows the permanent connection. After receiving the communication request 12 from the application server 8 via the connection mediation server 9, the communication relay device 3 identifies the application server 8 which is the access destination, and establishes a communication path 11 with the application server 8 by accessing the application server 8. The HTTP (Hypertext Transfer Protocol) session between the communication relay device 3 and the application server 8 with each other, for instance, is established so that the communication path 11 is realized. After the communication path 11 is established between the application server 8 and the communication relay device 3 as described above, the application server 8 is allowed to send job data 14 to the communication relay device 3 over the communication path 11. To be more specific, by using the HTTP session as a tunnel, substantial job data may be sent and received between the application server 8 and the communication relay device 3. In response to receiving the job data 14 from the application server 8 over the communication path 11, the communication relay device 3 forwards the job data 14 to the image processing device 4. Also, after completing the receipt of the job data 14 over the communication path 11, the communication relay device 3 terminates the communication path 11. At this time, the application server 8 also terminates the communication path 11 at the same time as the communication relay device 3.

When the job is created at the image processing device 4, the image processing device 4 sends the aforementioned communication request 12 to the communication relay device 3. However, this is given not for limitation. It is assumed, for example, that the job data 14 should be sent to the application server 8 may be generated in accompanied with the creation of the job. In this case, the image processing device 4 may send the job data 14 to the communication relay device 3 without sending the communication request 12. Even in this case, the job data 14 includes the attribution information 13. In response to receiving the communication request 12 or the job data 14 from the image processing device 4, the communication relay device 3 identifies the application server 8 which is the access destination, and establishes the communication path 11 with the application server 8 by accessing the identified application server 8. The communication relay device 3 forwards the received job data 14 from the image processing device 4 to the application server 8 over the communication path 11. After completing the transmission of the job data 14 over the communication path 11, the communication relay device 3 terminates the communication path 11. Also at this time, the application server 8 terminates the communication path 11 at the same time as the communication relay device 3.

As described above, the communication relay device 3 has a function to establish the communication path 11 with the application server 8 in order to send and receive the job data 14 between the application server 8 and the image processing device 4 when the job is created at the application server 8 or the image processing device 4. As shown in FIG. 1, the communication relay device 3 is capable of establishing more than one communication path 11 with the application server 8. An increase in the number of the communication path 11 with the application server 8, however, causes an increased load on the application server 8. It is assumed, for example, that the new job is created at the application server 8 or the image processing device 4 as at least one communication path 11 has already been established with the application server 8. In this case, the communication relay device 3 of the first preferred embodiment determines whether to create the new communication path 11 with the application server 8 or use the existing communication path 11 that had already created with the application server 8 to send and receive the job data 14 of the new job. The existing communication path 11 is the communication path which sends and receives the job data 14 of the existing job that had created prior to the new job. The communication relay device 3 may determine to use the existing communication path 11 that had already established with the application server 8. In this case, the communication relay device 3 is configured to send and receive the job data 14 of the new job over the existing communication path 11 that had already established with the application server 8. As a result, the increase in the number of the communication path 11 between the application server 8 and the communication relay device 3 may be curbed. Also, the increase in load on the application server 8 may be curbed. The communication relay device 3 is explained in detail next.

Figure 2:
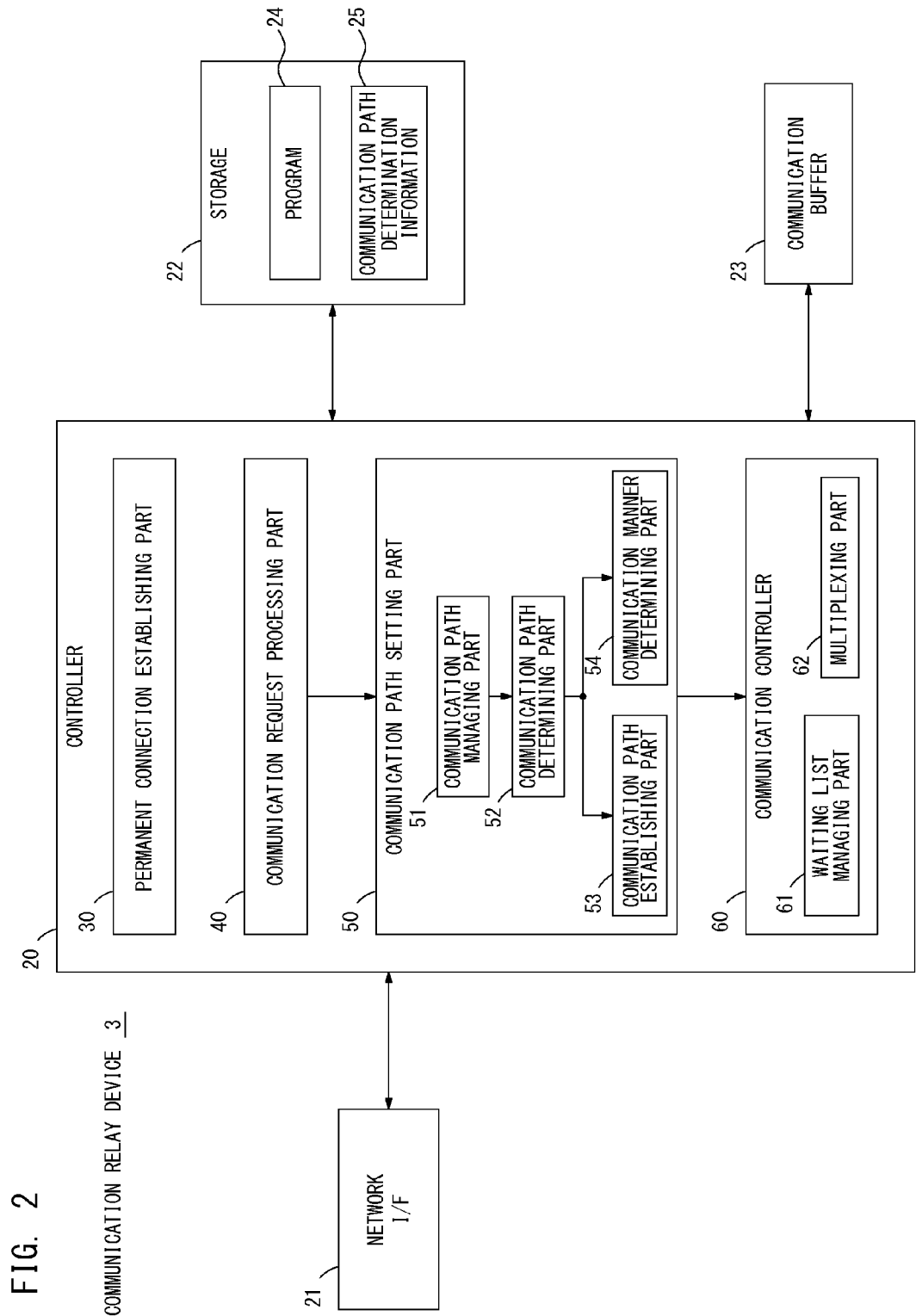
FIG. 2 is a block diagram showing an example of a hardware structure and that of a functional structure of a communication relay device of the first preferred embodiment.

FIG. 2 is a block diagram showing an example of a hardware structure and that of a functional structure of the communication relay device 3 of the first preferred embodiment. As illustrated in FIG. 2, the communication relay device 3 includes a controller 20, a network interface 21, a storage 22 and a communication buffer 23 as the hardware structure. The controller 20 which includes a CPU and a memory which are not shown in FIG. 2 performs main operations for relay of the job data 14. The network interface 21 is to connect the communication relay device 3 to the local network 6. The controller 20 communicates with each of the application server 8, the connection mediation server 9 and the image processing device 4 via the network interface 21. The storage 22 constructed by a device such as a semiconductor memory, for instance, stores therein in advance a program 24 and communication path determination information 25. Information including the aforementioned registration information is also stored in the storage 22, which is not shown in FIG. 2. The communication buffer 23 temporarily stores therein data such as the job data 14 sent and received between the application server 8 and the image processing device 4.

The CPU in the controller 20 reads and executes the program 24 in the storage 22 when the communication relay device 3 is powered on. As a result, the controller 20 serves as a permanent connection establishing part 30, a communication request processing part 40, a communication path setting part 50 and a communication controller 60.

The permanent connection establishing part 30 establishes the communication path 10 with the connection mediation server 9 when the communication relay device 3 is started up, and permanently maintains the communication path 10. As the communication path 10 is established by the permanent connection establishing part 30, the communication relay device 3 is allowed to establish permanent two-way communication with the connection mediation server 9. Thus, the communication relay device 3 is capable of receiving the communication request 12 from the application server 8 via the connection mediation server 9 when the job is created at the application server 8.

After the communication path 10 is established by the permanent connection establishing part 30, the controller 20 brings the communication request processing part 40 into operation. The communication request processing part 40 regularly monitors if the communication request 12 is received via the network interface 21. It is assumed that the job is created at the application server 8. In this case, the communication request 12 is sent to the communication relay device 3 via the connection mediation server 9 from the application server 8. It is assumed that the job is created at the image processing device 4. In also this case, the communication request 12 or the job data 14 is sent to the communication relay device 3 from the image processing device 4 as described above. As described above, the communication request processing part 40 regularly monitors not only if the communication request 12 is received but also if the job data 14 is received from the image processing device 4. In response to receiving the communication request 12 or the job data 14, the communication request processing part 40 determines that the job is created at the application server 8 or the image processing device 4. The communication request processing part 40 then brings the communication path setting part 50 into operation to set the communication path 11 for transmission and receipt of the job data 14 of the job.

The communication path setting part 50 sets the communication path 11 for transmission and receipt of the job data 14 of the job to and from the application server 8 when the job is created at the image processing device 4 or the application server 8. The communication path setting part 50 includes a communication path managing part 51, a communication path determining part 52, a communication path establishing part 53 and a communication manner determining part 54.

The communication path managing part 51 manages the number of the communication path 11 established with the application server 8. An upper limit on the number of the communication path 11 established with the application server 8 is set in advance with the communication path managing part 51. The communication path managing part 51 manages the number of the communication path 11 established with the application server 8 not to exceed the set upper limit. As a result, the number of the communication path 11 established with the application server 8 by the communication relay device 3 does not exceed the upper limit set in advance, resulting in reduced load on the application server 8. It is assumed, for example, that the multiple application servers 8 are installed on the cloud 7. In this case, the upper limit of the number of the communication path 11 is set for each application server 8.

The communication path determining part 52 determines the communication path 11 to send and receive the job data 14 of the job created at the application server 8 or the image processing device 4. To be more specific, the communication path determining part 52 determines whether to establish the new communication path 11 with the application server 8 or use the existing communication path 11 which had already established with the application server 8 to send and receive the job data 14 of the new job created at the application server 8 or the image processing device 4.

If the creation of the new job is detected as no communication path 11 with the application server 8 has been established, there should be no existing communication path 11. The communication path determining part 52 then determines to establish the new communication path 11 with the application server 8 for the new job.

It is assumed, for example, that the creation of the new job is detected when at least one communication path 11 has already been established with the application server 8. In this case, the communication path determining part 52 determines whether to establish the new communication path 11 or use the existing communication path 11. If the number of the existing communication path 11, for instance, is less than the upper limit, the communication path determining part 52 may determine to establish the new communication path 11 with the application server 8 unconditionally. In this case, however, the number of the communication path 11 with the application server 8 increases, resulting in increase in load on the application server 8. In order to reduce the load on the application server 8, the job data 14 of the new job preferably sent and received over the existing communication path 11 if the new job created at the application server 8 or the image processing device 4 is the low priority job even when the number of the existing communication path 11 is less than the upper limit. As described above, the communication path determining part 52 determines a priority level of the job even if the number of the existing communication path 11 is less than the upper limit. When it is the high priority job, the communication path determining part 52 determines to establish the new communication path 11. If it is the low priority job, it is preferable for the communication path determining part 52 to determine to use the existing communication path 11.

The priority level is determined based on the attribution information 13 of the job included in the information such as the communication request 12. FIG. 3 shows an example of the attribution information 13. The attribution information 13 includes information relating to a job ID, a job type, a destination device, a job issued user, a job issued device and an amount of data. The job ID is information to identify the job, and the job type indicates the detail of the job such as the print or the scan job. The destination device shows the destination of the job data 14. The job issued user is information relating to the user who has instructed to execute the job. The job issued user includes adjunct data that indicates if the user is either a general user or a managerial level user besides user identification information to identify the individual user, for example. The job issued device is information to designate the device at which the job is created. With the information, it is allowed to designate that the job is created at either the application server 8 or the image processing device 4. More than one application service may be provided at the application server 8. In this case, the job issued device includes information to specify the application service. The amount of data shows the amount of the job data 14 which is sent and received over the communication path 11.

The communication path determining part 52 obtains the job attribution information 13 as described above, and determines the priority level of the job based on the communication path determination information 25 stored in advance in the storage 22. FIGS. 4A and 4B show an example of the communication path determination information 25. The communication path determination information 25 includes, for example, first information 25a of FIG. 4A and second information 25b of FIG. 4B. It is defined whether or not the real-time processing is required for each information, the job type, the job issued device and the job issued user in the first information 25a. Thus, by referring to the first information 25a based on the attribution information 13 of the new job, the communication path determining part 52 is allowed to determine if the real-time processing is required for the new job. The numbers relating to the priority level depending on the real-time processing and the amount of job data 14 are defined in the second information 25b. By referring to the second information 25b based on the attribution information 13 of the new job, the communication path determining part 52 is allowed to determine the priority level of the new job. If the job gets a high number for the priority level, the transmission and receipt of the job data 14 needs to be complete promptly. The user is allowed to set as required if the real-time processing is required or not for each information, the job type, the job issued device and the job issued user. Also, the user is allowed to set as required the priority level depending on the real-time processing and the amount of data.

For determining either the new communication path 11 or the existing communication path 11 based on the priority level of the new job, the communication path determining part 52 determines to establish the new communication path 11 if the priority level of the new job get as described above is higher than a predetermined value. If the priority level of the new job is lower than the predetermined value, the communication path determining part 52 determines to use the existing communication path 11 to send and receive the job data 14 of the new job. To be more specific, if the priority level of the new job is lower than the predetermined value, the new communication path 11 is not established even though the number of the existing communication path 11 is less than the upper limit. In this case, the communication path determining part 52 determines to use the existing communication path 11 to send and receive the job data 14 of the new job. By using this determination method, the increase in the load on the application server 8 may be controlled.

If creation of the new job is detected as the number of the established communication path 11 with the application server 8 has reached the upper limit, the communication path determining part 52 is not allowed to establish the new communication path 11. In this case, the communication path determining part 52 determines to send and receive the job data 14 of the new job with the existing communication path 11.

After the communication path determining part 52 determines to establish the new communication path 11 for transmission and receipt of the job data 14 of the new job, it brings the communication path establishing part 53 into operation next. The communication path establishing part 53 accesses the application server 8, thereby establishing the new communication path 11 with the application server 8, and setting the established communication path 11 for transmission and receipt of the job data 14 of the new job.

On the other hand, the communication path determining part 52 may determine to use the existing communication path 11 for the new job created at the application server 8 or the image processing device 4. More than one communication path 11, however, may be existed. In this case, the communication path determining part 52 then selects one of the multiple existing communication paths 11 for transmission and receipt of the job data 14 of the new job. The communication path determining part 52 selects one of the communication paths 11 by using one of three methods as described below.

The first method is to select the existing communication path 11 over which the least amount of the job data 14 is sent and received based on the attribution information 13 of the multiple existing jobs, the job data 14 of each of which is sent and received over the respective multiple existing communication paths 11. If the existing communication path 11 over which the least amount of the job data 14 is sent and received is selected, the job data 14 of the new job may be sent and received efficiently.

The second method is to compare the priority levels of the multiple existing jobs and select the existing communication path 11 over which the job data 14 of the lowest-priority job is sent and received based on the attribution information 13 of the multiple existing jobs, the job data 14 of each of which is sent and received over the respective multiple existing communication paths 11. Sometimes the data transmission efficiency of the existing job decreases after starting the transmission and receipt of the job data 14 of the new job over the existing communication path 11. Even in such cases, the second method allows that the existing communication path 11 which has been used for the lowest-priority job to be selected. As a result, even if the data transmission efficiency of the existing job decreases, it does not cause a big problem.

The third method is to select the existing communication path 11 over which the job data 14 of the existing job which has been issued by the user or at the device the same as the new job is sent and received. To be more specific, it is assumed there is the existing job which had already been issued by the user who has also issued the new job or the existing job that had already been issued at the sender the same as that of the job data 14 of the new job. In this case, it is efficient to send and receive the job data 14 of the jobs over the same communication path 11. The third method allows that the job data 14 of the jobs issued at the same period by the same user or at the same device to be sent and received over the same communication path 11. This efficiently utilizes the communication path 11. It is assumed, for example, that the multiple application services are provided at the application server 8. In this case, the existing communication path 11 which has been used for the existing job which sends and receives the job data 14 for the application service may be selected for the same application service which sends and receives the job data 14 of the new job with the third method. Moreover, with the third method, the existing communication path 11 over which the job data 14 of the existing job which is to be sent to the same destination as the job data 14 of the new job may be selected besides aforementioned cases.

After selecting one of the existing communication paths 11 with one of the above-described first, second and third methods, the communication path determining part 52 brings the communication manner determining part 54 into operation next. The communication manner determining part 54 determines the communication manner for transmission and receipt of the job data 14 of the new job over the existing communication path 11. According to the first preferred embodiment, there are two communication manners, the first communication manner and the second communication manner, as the communication manner for transmission and receipt of the job data 14 of the new job over the existing communication path 11. The communication manner determining part 54 selects and determines either of the first and second communication manners.

In the first communication manner, the transmission and receipt of the job data 14 of the new job is started after completion of the transmission and receipt of the job data 14 of the existing job. It is assumed, for example, that the new job is created at the image processing device 4. In this case, in the first manner, the job data 14 of the new job is stored in the communication buffer 23 and registered into a waiting list of a queue, then the job data 14 of the new job in the communication buffer 23 is read after completion of the transmission and receipt of the job data 14 of the existing job. The read job data 14 of the new job is then sent to the application server 8 over the existing communication path 11. As described above, in the first communication manner, the transmission and receipt of the job data 14 of the existing job is complete earlier than the new job.

In the second communication manner, the job data 14 of the existing job and the new job is sent and received in a concurrent way at the same time by time-division multiplex. The second communication manner allows that the job data 14 of the existing job and the new job to be sent and received in a concurrent way at the same time. Thus, the transmission and receipt of the job data 14 of the new job may be started promptly.

The communication manner determining part 54 determines either of the first and second communication manners based on the attribution information 13 of the new job. The communication manner determining part 54 determines the priority level of the new job based on the attribution information 13 of the new job, and compares the priority levels of the new job and the existing job. The new job may be the lower priority job than the existing job. In this case, the communication manner determining part 54 determines the first communication manner. The job data 14 of the existing job then may be sent and received preferentially compared to the job data 14 of the new job. Thus, the job data 14 of the existing job may be sent and received earlier than that of the new job. The new job may be the higher priority job than the existing job. In this case, the communication manner determining part 54 determines the second communication manner. The job data 14 of the new job is then sent and received at the same time as the job data 14 of the existing job.

When the new communication path 11 is established for the new job, the communication manner determining part 54 is not put into operation. That is because, the new communication path 11 is occupied for the transmission and receipt of the job data 14 of the new job.

As described above, the existing communication path 11 is set as the communication path 11 to send and receive the job data 14 of the new job, and the communication manner over the existing communication path 11 is determined. In this case, the communication path setting part 50 informs the application server 8 that the job data 14 of the new job is sent and received over the existing communication path 11 and of the determined communication manner. As a result, the application server 8 is allowed to have the information that the job data 14 of the new job is sent and received over the existing communication path 11. Also, the job data 14 of the new job may be sent and received in the communication manner determined at the communication relay device 3. For the transmission and receipt of the job data 14 of the new job over the existing communication path 11, the communication path setting part 50 informs the application server

8 of the change of the termination condition of the existing communication path 11. As a result, the termination of the existing communication path 11 by the application server 8 may be prevented after the transmission and receipt of the job data 14 of the existing job is complete.

The communication controller 60 controls the transmission and receipt of the job data 14 to and from each of the image processing device 4 and the application server 8. For the transmission and receipt of the job data 14 to and from the application server 8, the communication controller 60 sends and receives the job data 14 over the communication path 11 set by the communication path setting part 50. Also, the communication controller 60 sends and receives the job data 14 of the new job in the communication manner determined by the communication manner determining part 54 for the transmission and receipt of the job data 14 of the new job over the existing communication path 11. Thus, communication controller 60 includes a waiting list managing part 61 and a multiplexing part 62.

The waiting list managing part 61 is brought into operation when it is determined that the job data 14 of the new job is sent and received in the first communication manner. The waiting list managing part 61 puts the job data 14 of the new job into the waiting list of the queue and manages the waiting list. After putting the job data 14 of the new job into the waiting list, the transmission and receipt of the job data 14 of the existing job may be complete. The waiting list managing part 61 then starts the transmission and receipt of the job data 14 of the new job over the existing communication path 11. It is assumed, for example, that the new job is created at the image processing device 4. In this case, the waiting list managing part 61 temporarily stores the job data 14 received from the image processing device 4 in the communication buffer 23, and holds it until the transmission and receipt of the job data 14 of the existing job completes. After the transmission and receipt of the job data 14 of the existing job, the waiting list managing part 61 reads the job data 14 of the new job in the communication buffer 23, and starts the transmission and receipt of the job data 14 of the new job over the available existing communication path 11.

The multiplexing part 62 is brought into operation when it is determined that the job data 14 of the new job is sent and received in the second communication manner. The multiplexing part 62 combines the job data 14 of the new job with the job data 14 of the existing job to send and receive the data. To be more specific, the multiplexing part 62 switches the transmission manner over the existing communication path 11 to the time-division multiplex, thereby sending and receiving the job data 14 of the existing job and the new job at the same time.

The communication controller 60 as described above terminates the communication path 11 after the transmission and receipt of the job data 14 to and from the application server 8 is complete. This reduces the load on the application server 8.

A sequential procedure of the process performed at the communication relay device 3 configured as described above is explained below. FIG. 5 is a flow diagram explaining an exemplary sequential procedure of the process performed at the communication relay device 3. The communication relay device 3 starts the process after being powered on. The communication relay device 3 starts a startup process (step S10), then establishes the communication path 10 to have a permanent access to the connection mediation server 9 (step S11). The communication relay device 3 is then put into a standby state until receiving the communication request 12 from the application server 8 or the image processing device 4 (step S12).

After receiving the communication request 12 from the application server 8 or the image processing device 4 (when a result of step S12 is YES), the communication relay device 3 determines whether or not there is the existing communication path 11 (step S13). There might be no existing communication path 11 (when a result of step S13 is NO). In this case, the communication relay device 3 establishes the new communication path 11 with the application server 8 (step S17), and sends and receives the job data 14 of the new job to and from the application server 8 over the new communication path 11 (step S25).

There might be the existing communication path 11 (when a result of step S13 is YES). In this case, the communication relay device 3 determines if the number of the existing communication path 11 reaches the upper limit (step S14). When the number of the existing communication path 11 is less than the upper limit (when a result of step S14 is NO), the communication relay device 3 determines the priority level of the new job based on the attribution information 13 of the new job created at the application server 8 or the image processing device 4 (step S15). The communication relay device 3 determines if the priority level of the new job is higher the predetermined value (step S16). If the priority level of the new job is higher than the predetermined value (when a result of step S16 is YES), the communication relay device 3 establishes the new communication path 11 with the application server 8 (step S17), and sends and receives the job data 14 of the new job to and from the application server 8 over the new communication path 11 (step S25).

If the priority level of the new job is lower than the predetermined value (when a result of step S16 is NO), the communication relay device 3 performs an existing communication path selecting process (step S18). Also when the number of the existing communication path 11 has already reached the upper limit after receiving the communication request 12 (when a result of step S14 is YES), the communication relay device 3 performs the existing communication path selecting process (step S18). In the existing communication path selecting process (step S18), the process based on one of flow diagrams of FIGS. 6 to 8 is performed.

Figure 6:
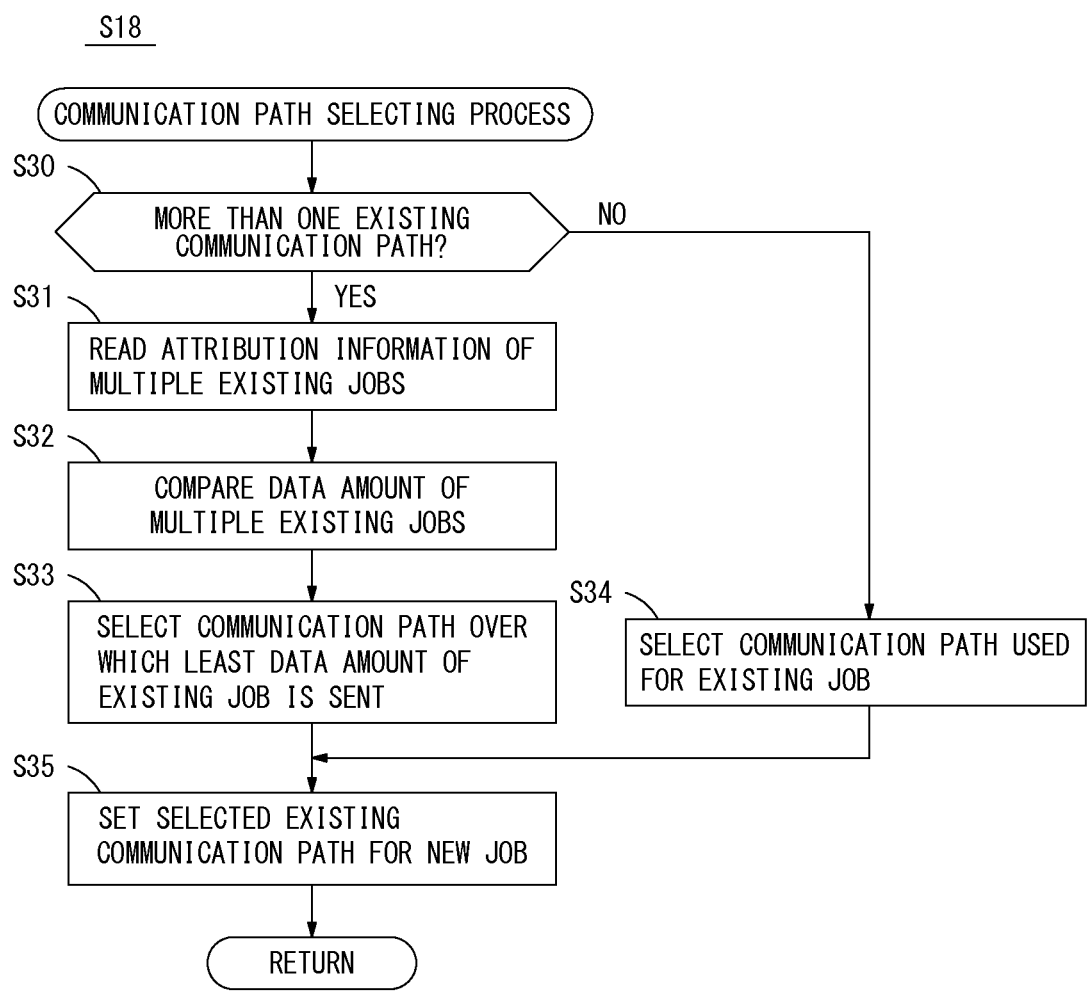
FIG. 6 is a flow diagram explaining an exemplary first sequential procedure relating to an existing communication path selecting process.

The existing communication path selecting process (step S18) of FIG. 6 is explained at first. The process shown in FIG. 6 corresponds to the aforementioned first method. Upon the start of the process, the communication relay device 3 determines if there are multiple existing communication paths 11 (step S30). There might be multiple existing communication paths 11 (when a result of step S30 is YES). In this case, the communication relay device 3 reads the attribution information 13 of the existing jobs, the job data 14 of each of which is sent and received over the respective existing communication paths 11 (step S31), and compares the amount of data of the multiple existing jobs (step S32). The communication relay device 3 then selects one of the existing communication paths 11 over which the least amount of data of the existing job is sent and received (step S33). There might be only one existing communication path 11 (when a result of step S30 is NO). In this case, the communication relay device 3 selects the existing communication path 11 over which the data of the existing job is sent and received (step S34). The communication relay device 3 then sets the existing communication path 11 selected in step S33 or S34 as the communication path 11 to send and receive the job data 14 of the new job (step S35). As described above, the existing communication path selecting process of FIG. 6 is complete.

Figure 7:
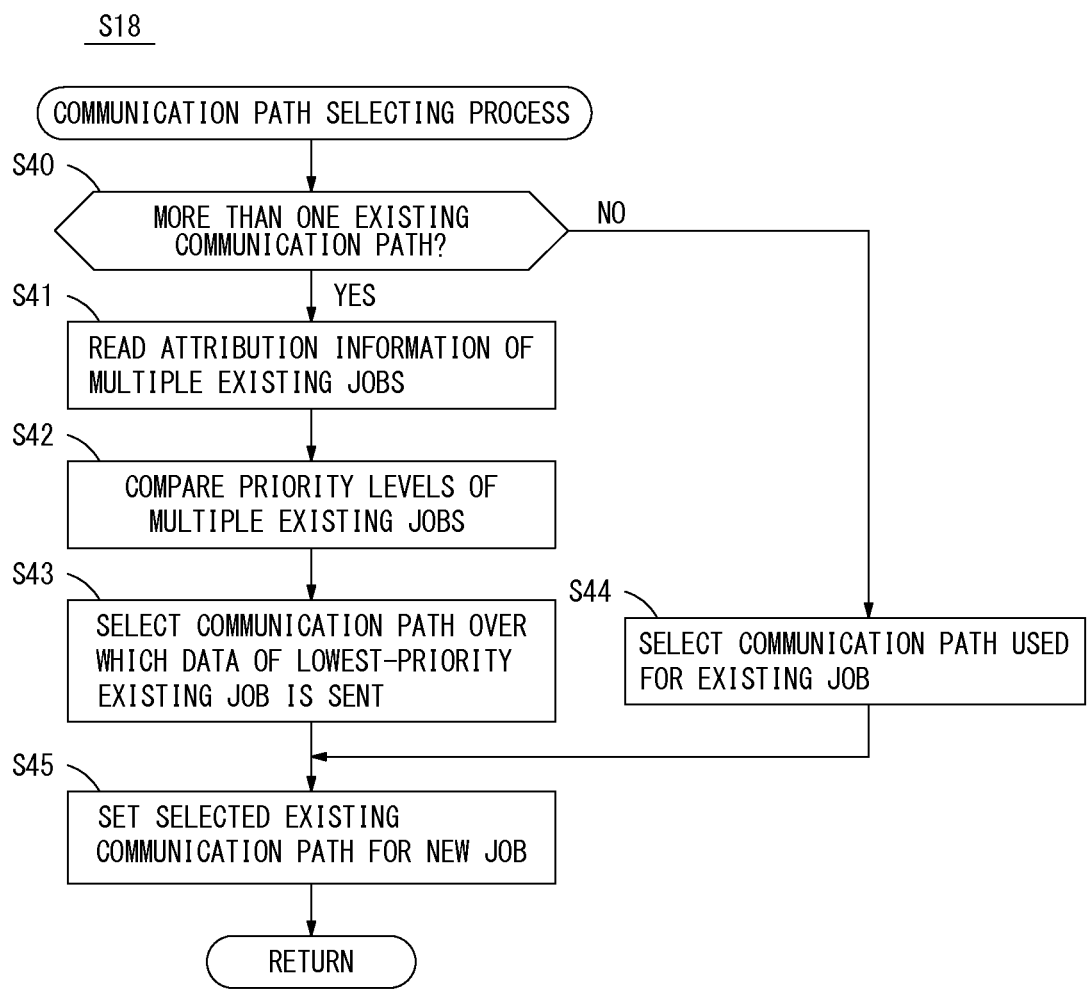
FIG. 7 is a flow diagram explaining an exemplary second sequential procedure relating to the existing communication path selecting process.

The existing communication path selecting process (step S18) of FIG. 7 is explained next. The process shown in FIG. 7 corresponds to the aforementioned second method. Upon the start of the process, the communication relay device 3 determines if there are multiple existing communication paths 11 (step S40). There might be multiple existing communication paths 11 (when a result of step S40 is YES). In this case, the communication relay device 3 reads the attribution information 13 of the existing jobs, the job data 14 of each of which is sent and received over the respective existing communication paths 11 (step S41), and compares the priority levels of the multiple existing jobs (step S42). The communication relay device 3 then selects one of the existing communication paths 11 over which the data of the lowest-priority existing job is sent and received (step S43). There might be only one existing communication path 11 (when a result of step S40 is NO). In this case, the communication relay device 3 selects the existing communication path 11 over which the data of the existing job is sent and received (step S44). The communication relay device 3 then sets the existing communication path 11 selected in step S43 or S44 as the communication path 11 to send and receive the job data 14 of the new job (step S45). As described above, the existing communication path selecting process of FIG. 7 is complete.

The existing communication path selecting process (step S18) of FIG. 8 is explained at last. The process shown in FIG. 8 corresponds to the aforementioned third method. Upon the start of the process, the communication relay device 3 determines if there are multiple existing communication paths 11 (step S50). There might be multiple existing communication paths 11 (when a result of step S50 is YES). In this case, the communication relay device 3 reads the attribution information 13 of the existing jobs, the job data 14 of each of which is sent and received over the respective existing communication paths 11 (step S51), and extracts one of the jobs which is issued by the same user or at the same device as the new job (step S52). The communication relay device 3 then selects one of the existing communication paths 11 over which the data of the extracted existing job is sent and received (step S53). There might be only one existing communication path 11 (when a result of step S50 is NO). In this case, the communication relay device 3 selects the existing communication path 11 over which the data of the existing job is sent and received (step S54). The communication relay device 3 then sets the existing communication path 11 selected in step S53 or S54 as the communication path 11 to send and receive the job data 14 of the new job (step S55). As described above, the existing communication path selecting process of FIG. 8 is complete.

The communication relay device 3 selects one of the existing communication paths 11 as described above. Referring back to the flow diagram of FIG. 5, the communication relay device 3 compares the priority level of the new job with that of the existing job (step S19). The priority level of the new job may be higher than that of the existing job (when a result of step S20 is YES). In this case, the communication relay device 3 determines the second communication manner in which the job data 14 of the new job and the existing job is combined and sent and received (step S21). On the other hand, the priority level of the new job may be the same or lower than that of the existing job (when a result of step S20 is NO). In this case, the communication relay device 3 puts the job data 14 of the new job into the waiting list of the queue, and determines the first communication manner in which the transmission and receipt of the job data 14 of the new job is started after the transmission and receipt of the job data 14 of the existing job (step S22).

The communication relay device 3 then informs the application server 8 of the existing communication path 11 selected in step S18 and the communication manner determined in step S21 or S22 (step S23). The communication relay device 3 sends an order of changing the termination condition of the existing communication path 11 to the application server 8 (step S24). The communication relay device 3 then sends and receives the job data 14 of the new job over the existing communication path 11 (step S25).

Figure 9A:
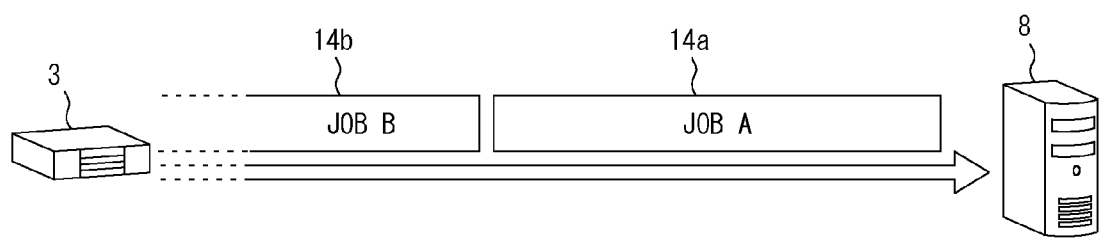
FIGS. 9A and 9B are conceptual diagrams showing communication manners of transmission and receipt of job data of the new job over the existing communication path over which the job data of the existing job is being sent and received.
Figure 9B:
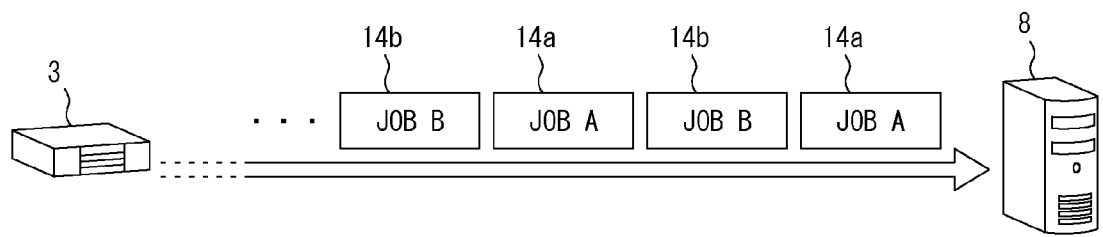

FIGS. 9A and 9B are conceptual diagrams when job data 14b of a new job B is sent and received over the existing communication path 11 over which job data 14a of an existing job A is being sent and received. FIG. 9A shows the first communication manner and FIG. 9B shows the second communication manner. For sending the job data 14b of the new job B to the application server 8 in the first communication manner, the communication relay device 3 starts the transmission of the job data 14b of the new job B after the transmission of the job data 14a of the existing job A as shown in FIG. 9A. On the other hand, for sending the job data 14b of the new job B to the application server 8 in the second communication manner, the communication relay device 3 sends the job data 14a of the existing job A and the job data 14b of the new job B one after the other by time-sharing as shown in FIG. 9B. It is assumed, for example, the amount of the job data 14b of the new job B is less than that of the job data 14a of the existing job A. In this case, the transmission of the job data 14b of the new job B may be carried out rapidly in the second communication manner rather than the first communication manner. If the priority level of the job B is higher than that of the job A, the second communication manner should be selected. The job data of the high-priority new job may be sent to the application server 8 efficiently. In FIGS. 9A and 9B, each job data 14a and 14b of the existing job A and the new job B is sent from the image processing device 4 to the application server 8. The concept in FIGS. 9A and 9B is the same when either or both of the job data 14a and/or 14b of the existing job A and/or the new job B is sent from the application server 8 to the image processing device 4.

As described above, the communication relay device 3 of the first preferred embodiment is installed on the local network 6, and relays the communications between the image processing device 4 installed on the local network 6 and the application server 8 installed on the network different from the local network 6. If the new job is created at the image processing device 4 or the application server 8 as at least one communication path 11 has already established with the application server 8, the communication relay device 3 sets either the new communication path or the existing communication path as the communication path to send and receive the job data 14 of the new job. As described above, the new communication path 11 is not necessary to be established every time the new job is created at the image processing device 4 or the application server 8. As a result, the number of the communication path 11 established with the application server 8 is not increased more than necessary. Thus, the increase in the number of the communication path 11 should be managed by the application server 8 may be controlled, resulting in less load on the application server 8.

It is assumed that the existing communication path 11 is set as the communication path 11 to send and receive the job data 14 of the new job. In this case, the communication relay device 3 of the first preferred embodiment determines either of the first and the second communication manners based on the attribution information 13 of the new job. The transmission and receipt of the job data 14 of the new job is started after the transmission and receipt of the job data 14 of the existing job completes in the first communication manner. The job data 14 of the existing job and the new job is combined, and sent and received in the second communication manner. As a result, for the transmission and receipt of the job data 14 of the new job over the existing communication path 11, the appropriate communication manner may be determined based on the attribution information 13 of the new job.

It is assumed that the creation of the new job is detected as the multiple existing communication paths 11 have already established with the application server 8. For setting the existing communication path 11 as the communication path to send and receive the job data 14 of the new job, the communication relay device 3 of the first preferred embodiment selects and sets one of the multiple existing communication paths 11. The communication relay device 3 selects and sets the existing communication path 11 over which the job data 14 of the new job is allowed to be sent and received efficiently. Even when the existing communication path 11 is used, the job data 14 of the new job is allowed to be sent and received to and from the application server 8 efficiently.

Moreover, even when the number of the existing communication paths 11 is less than the upper limit, the communication relay device 3 of the first preferred embodiment is allowed to select whether to establish the new communication path 11 or to use one of the existing communication paths 11 based on the attribution information 13 of the new job. It is allowed to control not to have the communication path 11 between the application server 8 and the communication relay device 3 more than necessary, resulting in further improvement in a load reduction effect of the application server 8.

As described above, the number of the communication paths established with the application server may be controlled, so that the load on the application server may be reduced.

(Second Preferred Embodiment)

A second preferred embodiment is described next. FIG. 10 shows an exemplary configuration of the information processing system 1 of the second preferred embodiment. The difference between the information processing systems 1 of the first and the second preferred embodiments is that the information processing system 1 of the second preferred embodiment comprises multiple communication relay devices 3a and 3b on the local network 6. It is assumed that the multiple communication relay devices 3a and 3b are installed on the local network 6. In this case, the new job is sometimes created at the application server 8 as shown in FIG. 10, for instance, and the communication request 12 may be sent to the communication relay device 3 via the connection mediation server 9 from the application server 8. When the communication relay device 3b receives the communication request 12 from the application server 8, another communication device 3a may have already established the communication path 11 with the application server 8. In such a case, the communication relay device 3b received the communication request 12 determines based on the attribution information 13 of the new job whether or not to send and receive the job data 14 of the new job over the existing communication path 11 which has already been established by another communication device 3a. When it is determined to send and receive the job data 14 of the new job over the existing communication path 11 which has already been established by another communication device 3a, the communication device 3b sends and receives the job data 14 to and from the application server 8 via another communication device 3a.

Figure 11:
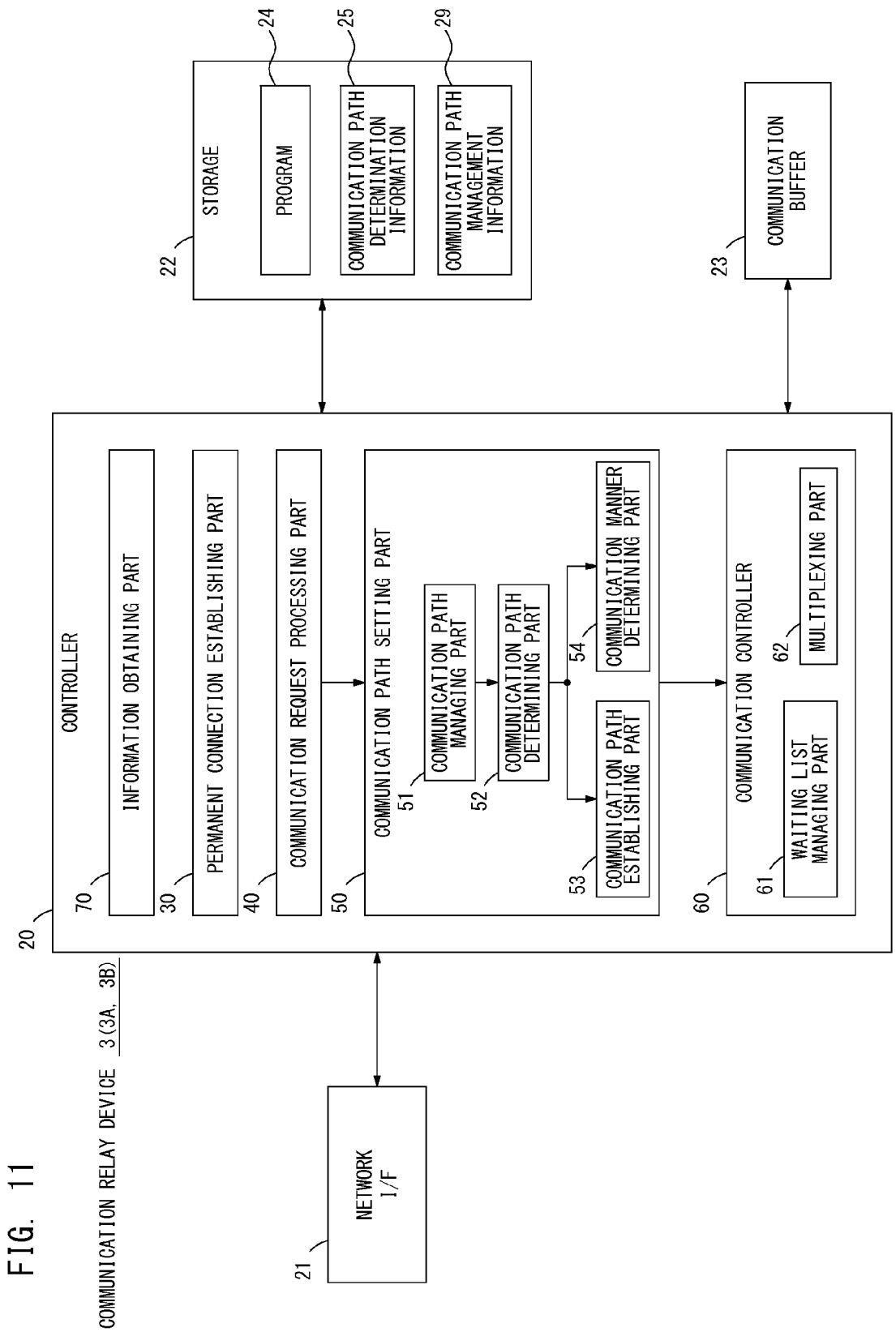
FIG. 11 is a block diagram showing an example of a hardware structure and that of a functional structure of the communication relay device of the second preferred embodiment.

FIG. 11 is a block diagram showing an example of a hardware structure and that of a functional structure of the communication relay devices 3a and 3b. The difference between the communication relay devices 3a and 3b of the second preferred embodiment from the communication relay device 3 of the first preferred embodiment is that the CPU of the controller 20 executes the program 24, thereby putting the controller 20 to function as an information obtaining part 70. The controller 20 serves as the permanent connection establishing part 30, the communication request processing part 40, the communication path setting part 50 and the communication controller 60 besides the information obtaining part 70, which is the same as in the first preferred embodiment.

When there is another communication relay device 3a or 3b on the local network 6, the information obtaining part 70 obtains information relating to the communication path 11 that has already been established with the application server 8 by another communication relay device 3a or 3b. The information obtaining part 70 exchanges the information relating to the communication path 11 with another communication relay device 3a or 3b over the local network 6 on the periodical basis, and manages the existing communication path 11 established with the application server 8 by another communication relay device 3a or 3b.

The new job may be created at the application server 8 or the image processing device 4, and the communication request processing part 40 may receive the communication request 12 from the application server 8 or the image processing device 4. The controller 20 then brings the communication path setting part 50 into operation. For setting the communication path 11 for transmission and receipt of the job data 14 of the new job, the communication path setting part 50 determines whether to establish the new communication path 11 or to use the existing communication path 11 including the existing communication paths 11 already established by another communication relay device 3a or 3b. The communication path setting part 50 may determine to use the existing communication path 11. In this case, the communication path setting part 50 selects one of the existing communication paths 11 including the communication paths 11 established by another communication relay device 3a or 3b. This selecting method is the same as that explained in the first preferred embodiment. The existing communication path 11 established by another communication relay device 3a or 3b may be selected. In this case, the communication controller 60 sends and receives the job data to and from the application server 8 via another communication relay device 3a or 3b. It is assumed, for example, the new job is created at the application server 8. In this case, the job data 14 of the new job is obtained via another communication relay device 3a or 3b, and the obtained job data 14 is forwarded to the image processing device 4. It is assumed, for example, the new job is created at the image processing device 4. In this case, the job data 14 received from the image processing device 4 is forwarded to another communication relay device 3a or 3b, and is sent to the application server 8 via another communication relay device 3a or 3b.

As described above, when there is another communication relay device 3a or 3b on the local network 6, the communication relay device 3 of the second preferred embodiment obtains the information relating to the communication path 11 which has already been established by another communication relay device 3a or 3b with the application server 8. The communication relay device 3 includes the information obtaining part 70 for managing the obtained information. It is assumed, for instance, that the new job may be created at the image processing device 4 or the application server 8 as at least one communication path 11 is established by another communication relay device 3a or 3b with the application server 8. In this case, the communication path setting part 50 determines whether or not to send and receive the job data of the new job over the existing communication path 11 established by another communication relay device 3a or 3b. The communication relay device 3 is allowed to send and receive the job data 14 to and from the application server 8 via another communication relay device 3a or 3b based on the determination result. As described above, the number of the communication paths 11 that should be managed at the application server 8 may further be reduced, resulting in more reduction of the load on the application server 8.

Everything else except for the points described above in the second preferred embodiment is the same as that explained in the first preferred embodiment. The second preferred embodiment achieves the same working-effect as the first preferred embodiment.

(Modifications)

While the preferred embodiments of the present invention have been described above, the present invention is not limited to the preferred embodiments. Various modifications may be applied to the present invention.

According to the above-described first and second preferred embodiments, the application server 8 and the connection mediation server 9 are installed on the cloud 7 on the internet. However, this is given not for limitation. More specifically, the servers only have to be installed on the network different from the local network 6 to which the communication relay device 3 and the image processing device 4 are connected.

According to the above-described first and second preferred embodiments, the communication relay device 3 is the device separated from the image processing device 4. However, this is given not for limitation. The communication relay device 3 may be embedded in the image processing device 4. In this case, it is not necessary for the communication relay device 3 to be embedded in each of the multiple image processing devices 4a and 4b connected to the local network 6. The communication relay device 3 may be embedded in at least one image processing device 4.

What is claimed is:

1. A communication relay device installed on a local network, said communication relay device relaying communications between an image processing device installed on said local network and an application server installed on a network different from said local network, comprising:
a communication path setting part that sets a communication path to send and receive job data of a job to and from said application server when the job is created at said image processing device or said application server; and
a communication controller that sends and receives the job data to and from said application server over the communication path set by said communication path setting part, wherein
when a new job is created at said image processing device or said application server and at least one existing communication path has been established with said application server, said communication path setting part determines whether to use the at least one existing communication path or a new communication path and then selects either the new communication path or the at least one existing communication path for transmission and receipt of the job data of the new job based on the determination of whether to use the at least one existing communication path or the new communication path, and
said communication path setting part manages an upper limit on a number of the communication path established with said application server, and sets the at least one existing communication path for the transmission and receipt of the job data of the new job when the new job is created at said image processing device or said application server and the number of the established communication path with said application server has already reached said upper limit.

2. The communication relay device according to claim 1, wherein
when the at least one existing communication path is set for the transmission and receipt of the job data of the new job, said communication path setting part determines either a first communication manner or a second communication manner based on attribution information of the new job, the transmission and receipt of the job data of the new job being started after the transmission and receipt of the job data of the existing job in said first communication manner and the job data of the existing job and the job data of the new job being combined to be transmitted and received in said second communication manner, and
said communication controller sends and receives the job data of the new job to and from said application server based on the decision made by said communication path setting part.

3. The communication relay device according to claim 2, wherein the attribution information includes information relating to a job type, an amount of data, a job issued user and a job issued device.

4. The communication relay device according to claim 1, wherein when the new job is created at said image processing device or said application server and there are multiple existing communication paths established with said application server and one of said existing communication paths is to be set for the transmission and receipt of the job data of the new job, said communication path setting part selects and sets one of said multiple existing communication paths.

5. The communication relay device according to claim 4, wherein for selecting one of said multiple existing communication paths, said communication path setting part selects the existing communication path over which the least amount of the job data is sent and received based on the attribution information of the multiple existing jobs whose job data is sent and received over said respective multiple existing communication paths.

6. The communication relay device according to claim 4, wherein
for selecting one of said multiple existing communication paths, said communication path setting part compares the priority levels of the multiple existing jobs based on the attribution information of the multiple existing jobs whose job data is sent and received over said respective multiple existing communication paths, and selects one of the existing communication paths over which the job data of the lowest-priority job is sent and received.

7. The communication relay device according to claim 4, wherein
for selecting one of said multiple existing communication paths, said communication path setting part selects one of the existing communication paths over which the job data of the job which has issued by a same user or at a same device as said new job is sent and received.

8. The communication relay device according to claim 1, wherein for setting either the new communication path or the at least one existing communication path for the transmission and receipt of the job data of the new job, said communication path setting part sets either the new communication path or the at least one existing communication path based on the attribution information of the new job.

9. The communication relay device according to claim 1, wherein said communication path setting part sets the new communication path for the transmission and receipt of the job data of the new job when the new job is created at said image processing device or said application server and the number of the established communication path with said application server is less than said upper limit.

10. The communication relay device according to claim 1, further comprising:
an information obtaining part that obtains information relating to the communication path established with said application server by another communication relay device when there is said another communication relay device on said local network, wherein
said communication path setting part determines whether or not to send and receive the job data of the new job over the existing communication path established by said another communication relay device based on the attribution information of the new job when the new job is created at said image processing device or said application server as at least one communication path is established by said another communication relay device with said application server, and
said communication controller sends and receives the job data to and from said application server via said another communication relay device when said communication path setting part determines to send and receive the job data of the new job over the existing communication path established by said another communication relay device.

11. The communication relay device according to claim 1, wherein when the at least one existing communication path is set as the communication path for the transmission and receipt of the job data of the new job, said communication path setting part informs said application server of a communication path termination condition over the at least one existing communication path.

12. The communication relay device according to claim 1, further comprising:
a part that generates and manages registration information with which at least one image processing device installed on said local network is registered as a target of communication relay.

13. The communication relay device according to claim 1, further comprising:
a detector that detects the creation of the job over said different network when a job is created at said application server.

14. The communication relay device according to claim 1, wherein said communication path setting part, based on attribute information of said new job, determines whether to use either the new communication path or the at least one existing communication path for transmission and receipt of the job data of the new job.

15. A communication relay device installed on a local network, said communication relay device relaying communications between an image processing device installed on said local network and an application server installed on a network different from said local network, comprising:
a communication path setting part that sets a communication path to send and receive job data of a job to and from said application server when the job is created at said image processing device or said application server; and
a communication controller that sends and receives the job data to and from said application server over the communication path set by said communication path setting part, wherein
when a new job is created at said image processing device or said application server and at least one existing communication path has been established with said application server, said communication path setting part determines whether to use the at least one existing communication path or a new communication path and then selects either the new communication path or the at least one existing communication path for transmission and receipt of the job data of the new job based on the determination of whether to use the at least one existing communication path or the new communication path,
when the at least one existing communication path is set for the transmission and receipt of the job data of the new job, said communication path setting part determines either a first communication manner or a second communication manner based on attribution information of the new job, the transmission and receipt of the job data of the new job being started after the transmission and receipt of the job data of the existing job in said first communication manner and the job data of the existing job and the job data of the new job being combined to be transmitted and received in said second communication manner,
said communication controller sends and receives the job data of the new job to and from said application server based on the decision made by said communication path setting part, and
when the at least one existing communication path is set for the transmission and receipt of the job data of the new job, said communication path setting part compares priority levels of the existing job and the new job based on the attribution information of the existing job whose job data is sent and received over the at least one existing communication path and that of the new job, and determines said first communication manner if the priority level of the new job is lower than that of the existing job, and determines said second communication manner if the priority level of the new job is higher than that of the existing job.

16. A non-transitory computer readable recording medium storing a program to be executed by a communication relay device installed on a local network, the program being executed to relay communications between an image processing device installed on said local network and an application server installed on a network different from said local network, execution of the program by said communication relay device causing said communication relay device to execute the steps of:

(a) setting a communication path to send and receive job data of a job to and from said application server when the job is created at said image processing device or said application server; and (b) sending and receiving the job data to and from said application server over the communication path set in said step (a), wherein when a new job is created at said image processing device or said application server and at least one existing communication path has been established with said application server, execution of the program by said communication relay device causes said communication relay device to determine whether to use the at least one existing communication path or a new communication path and then select either the new communication path or the at least one existing communication path for transmission and receipt of the job data of the new job in said step (a) based on the determination of whether to use the at least one existing communication path or the new communication path, and an upper limit on a number of the communication path established with said application server is managed, and the at least one existing communication path is set for the transmission and receipt of the job data of the new job in said step (a) when the new job is created at said image processing device or said application server as the number of the established communication path with said application server has already reached said upper limit.

17. The non-transitory computer readable recording medium according to claim 16, wherein when the at least one existing communication path is set for the transmission and receipt of the job data of the new job, either a first communication manner or a second communication manner is determined based on attribution information of the new job in said step (a), the transmission and receipt of the job data of the new job being started after the transmission and receipt of the job data of the existing job in said first communication manner and the job data of the existing job and the job data of the new job being combined to be transmitted and received in said second communication manner, and the job data of the new job is sent and received to and from said application server in said step (b) based on the decision made in said step (a).

18. The non-transitory computer readable recording medium according to claim 17, wherein the attribution information includes information relating to a job type, an amount of data, a job issued user and a job issued device.

19. The non-transitory computer readable recording medium according to claim 16, wherein when the new job is created at said image processing device or said application server and there are multiple existing communication paths established with said application server and one of said existing communication paths is to be set for the transmission and receipt of the job data of the new job, one of said multiple existing communication paths is selected and set in said step (a).

20. The non-transitory computer readable recording medium according to claim 19, wherein for selecting one of said multiple existing communication paths, the existing communication path over which the least amount of the job data is sent and received is selected in said step (a) based on the attribution information of the multiple existing jobs whose job data is sent and received over said respective multiple existing communication paths.

21. The non-transitory computer readable recording medium according to claim 19, wherein for selecting one of said multiple existing communication paths, the priority levels of said multiple existing jobs are compared based on the attribution information of the multiple existing jobs whose job data is sent and received over said respective multiple existing communication paths, and one of the existing communication paths over which the job data of the lowest-priority job is sent and received is selected in said step (a).

22. The non-transitory computer readable recording medium according to claim 19, wherein for selecting one of said multiple existing communication paths, one of the existing communication paths over which the job data of the job which has issued by a same user or at a same device as the new job is sent and received is selected in said step (a).

23. The non-transitory computer readable recording medium according to claim 16, wherein for setting either the new communication path or the at least one existing communication path for the transmission and receipt of the job data of the new job, either the new communication path or the at least one existing communication path is set based on the attribution information of the new job in said step (a).

24. The non-transitory computer readable recording medium according to claim 16, wherein the new communication path is set for the transmission and receipt of the job data of the new job in said step (a) when the new job is created at said image processing device or said application server as the number of the established communication path with said application server is less than said upper limit.

25. The non-transitory computer readable recording medium according to claim 16, execution of the program by said communication relay device causing said communication relay device to execute the further step of:

(c) obtaining information relating to the communication path established with said application server by another communication relay device when there is said another communication relay device on said local network, wherein whether or not to send and receive the job data of the new job over the existing communication path established by said another communication relay device is determined based on the attribution information of the new job in said step (a) when the new job is created at said image processing device or said application server as at least one communication path is established by said another communication relay device with said application server, and the job data is sent and received to and from said application server via said another communication relay device in said step (b) when the transmission and receipt of the job data of the new job over the existing communication path established by said another communication relay device is determined in said step (a).

26. The non-transitory computer readable recording medium according to claim 16, wherein when the at least one existing communication path is set for the transmission and receipt of the job data of the new job, said application server is informed of a communication path termination condition over the at least one existing communication path in said step (a).

27. The non-transitory computer readable recording medium according to claim 16, execution of the program by said communication relay device causing said communication relay device to execute the further step of:

(d) generating and managing registration information with which at least one image processing device installed on said local network is registered as a target of communication relay.

28. A non-transitory computer readable recording medium storing a program to be executed by a communication relay device installed on a local network, the program being executed to relay communications between an image processing device installed on said local network and an application server installed on a network different from said local network, execution of the program by said communication relay device causing said communication relay device to execute the steps of:

(a) setting a communication path to send and receive job data of a job to and from said application server when the job is created at said image processing device or said application server; and (b) sending and receiving the job data to and from said application server over the communication path set in said step (a), wherein when a new job is created at said image processing device or said application server and at least one existing communication path has been established with said application server, execution of the program by said communication relay device causes said communication relay device to determine whether to use the at least one existing communication path or a new communication path and then select either the new communication path or the at least one existing communication path for transmission and receipt of the job data of the new job in said step (a) based on the determination of whether to use the at least one existing communication path or the new communication path, wherein when the at least one existing communication path is set for the transmission and receipt of the job data of the new job, either a first communication manner or a second communication manner is determined based on attribution information of the new job in said step (a), the transmission and receipt of the job data of the new job being started after the transmission and receipt of the job data of the existing job in said first communication manner and the job data of the existing job and the job data of the new job being combined to be transmitted and received in said second communication manner, the job data of the new job is sent and received to and from said application server in said step (b) based on the decision made in said step (a), and when the at least one existing communication path is set for the transmission and receipt of the job data of the new job, priority levels of the existing job and the new job are compared based on the attribution information of the existing job whose job data is sent and received over the at least one existing communication path and that of the new job, and said first communication manner is determined if the priority level of the new job is lower than that of the existing job, and said second communication manner is determined if the priority level of the new job is higher than that of the existing job in said step (a).

29. A communication relay method of relaying communications between an image processing device installed on said local network and an application server installed on a network different from said local network, comprising the steps of:

(a) setting a communication path to send and receive job data of a job to and from said application server when the job is created at said image processing device based on a fact that the job is created at said image processing device, and detecting that the job is created over said different network and setting the communication path to send and receive the job data of the job to and from said application server when the job is created at said application server; and (b) sending and receiving the job data to and from said application server over the communication path set in said step (a), wherein when a new job is created at said image processing device or said application server and at least one existing communication path has been established with said application server, the method include determining whether to use the at least one existing communication path or a new communication path and then selecting either a new communication path or the at least one existing communication path for transmission and receipt of the job data of the new job in said step (a) based on the determination of whether to use the at least one existing communication path or the new communication path, an upper limit on a number of the communication path established with said application server is managed, and the at least one existing communication path is set for the transmission and receipt of the job data of the new job in said step (a) when the new job is created at said image processing device or said application server as the number of the established communication path with said application server has already reached said upper limit.

* * * * *